(12) United States Patent
Chen et al.

(10) Patent No.: US 9,225,397 B2
(45) Date of Patent: Dec. 29, 2015

(54) EFFICIENT RANK AND PRECODING MATRIX FEEDBACK FOR MIMO SYSTEMS

(75) Inventors: Runhua Chen, Dallas, TX (US); Eko N. Onggosanusi, Allen, TX (US); Badri Varadarajan, Dallas, TX (US); Anand G. Dabak, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 2159 days.

(21) Appl. No.: 12/170,319

(22) Filed: Jul. 9, 2008

(65) Prior Publication Data
US 2009/0017769 A1 Jan. 15, 2009

Related U.S. Application Data

(60) Provisional application No. 60/948,841, filed on Jul. 10, 2007, provisional application No. 61/030,308, filed on Feb. 21, 2008.

(51) Int. Cl.
*H04B 7/04* (2006.01)
*H04B 7/06* (2006.01)

(52) U.S. Cl.
CPC .............. *H04B 7/0417* (2013.01); *H04B 7/063* (2013.01); *H04B 7/0632* (2013.01); *H04B 7/0639* (2013.01)

(58) Field of Classification Search
CPC .............................. H04W 16/14; H04W 72/082
USPC .............................. 455/69; 375/260–262, 329
See application file for complete search history.

(56) References Cited

U.S. PATENT DOCUMENTS

| | | | |
|---|---|---|---|
| 2007/0191066 A1* | 8/2007 | Khojastepour et al. | 455/562.1 |
| 2008/0037675 A1* | 2/2008 | Lin et al. | 375/262 |
| 2008/0292013 A1* | 11/2008 | Varadarajan et al. | 375/260 |
| 2009/0006518 A1* | 1/2009 | Rensburg et al. | 708/520 |
| 2009/0017769 A1* | 1/2009 | Chen et al. | 455/69 |
| 2010/0322176 A1* | 12/2010 | Chen et al. | 370/329 |

* cited by examiner

*Primary Examiner* — David Bilodeau
(74) *Attorney, Agent, or Firm* — Ronald O. Neerings; Frank D. Cimino

(57) ABSTRACT

The present disclosure provides a receiver, a transmitter and methods of operating a receiver or a transmitter. In one embodiment, the receiver includes a receive unit configured to receive transmissions from multiple antennas. The receiver also includes a rank feedback unit configured to feed back a transmission rank selection, wherein the transmission rank selection corresponds to a transmission rank feedback reduction scheme. The receiver further includes a precoding feedback unit configured to feed back a precoding matrix selection, wherein the precoding matrix selection corresponds to a precoding matrix feedback reduction scheme.

28 Claims, 4 Drawing Sheets

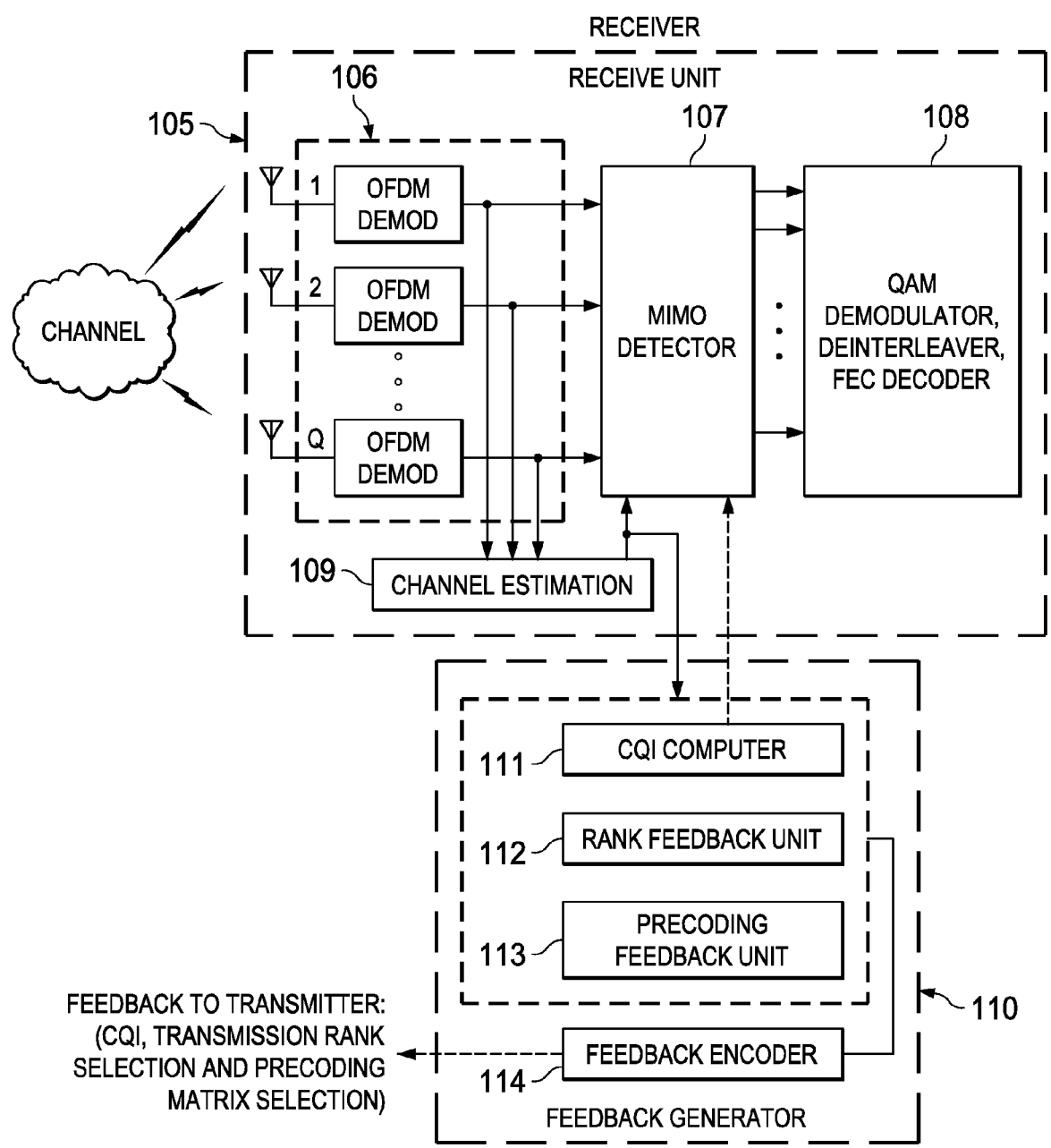

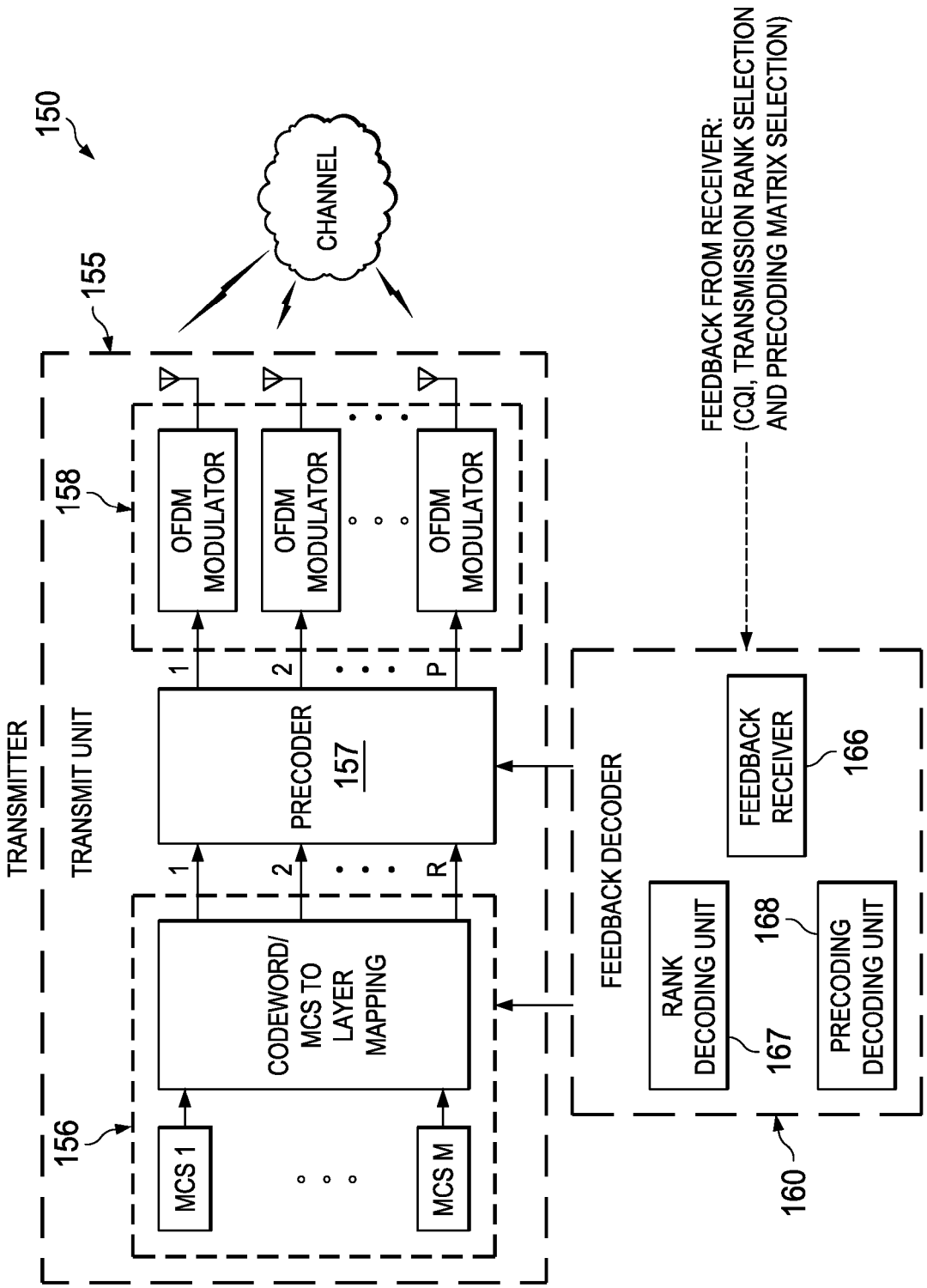

EFFICIENT RANK AND PRECODING MATRIX FEEDBACK FOR MIMO SYSTEMS

CROSS-REFERENCE TO PROVISIONAL APPLICATIONS

This application claims the benefit of U.S. Provisional Application No. 61/030,308 entitled "Efficient Rank and Precoding Matrix Feedback for SU-MIMO" to Runhua Chen, Eko N. Onggosanusi, Badri Varadarajan and Anand G. Dabak, filed on Feb. 21, 2008, which is incorporated herein by reference in its entirety.

This application also claims the benefit of U.S. Provisional Application No. 61/030,308 entitled "Efficient Rank and Precoding Matrix Feedback for SU-MIMO" to Runhua Chen, Eko N. Onggosanusi, Badri Varadarajan and Anand G. Dabak, filed on Feb. 28, 2008, which is incorporated herein by reference in its entirety.

TECHNICAL FIELD

The present disclosure is directed, in general, to communication systems and, more specifically, to a receiver, a transmitter and methods of operating a receiver or a transmitter.

BACKGROUND

In orthogonal frequency division multiple access (OFDMA) communication systems, the total bandwidth is divided into non-overlapping frequency blocks also called resource blocks (RBs), where transmissions for user equipment (UE) occur in an orthogonal and not mutually interfering manner. Each RB carries data for a specific UE. By scheduling each UE on RBs where it has a high signal to interference and noise ratio (SINR), the data rate may be maximized according to a specific scheduling criterion. To enable frequency-domain scheduling and allocate UEs on RBs with good SINR, each UE feeds back a channel quality indicator (CQI) to its serving base station (Node B).

For MIMO communication with downlink precoding, a pre-defined codebook is designed offline and known at the Node B and UE. The codebook consists of a set of matrices $U \in C^{N \times R}$, where N is the number of transmit antennas and R is the transmission rank that determines the number of data layers multiplexed in the spatial domain. Both the transmission rank R and the precoding matrix U may be chosen to optimize performance on each RB. However, in many practical systems such as 3GPP LTE, the transmission rank R is fixed on all RBs for a given UE. The precoding matrix, however, could vary from one RB to the other, even for the same UE.

In order to find an optimum rank and precoding matrix, a UE applies the estimated CQI to exhaustively search all ranks and all precoding matrices in each rank codebook. A preferred transmission rank R and precoding matrix U are chosen to optimize a certain optimality metric such as the transmission throughput according to the specific scheduling criterion. The preferred rank and precoding matrix index are then fed back or reported to the Node B. Improvements in the selection and feed back of rank and precoding requirements would prove beneficial in the art.

SUMMARY

Embodiments of the present disclosure provide a receiver, a transmitter and methods of operating a receiver or a transmitter. In one embodiment, the receiver includes a receive unit configured to receive transmissions from multiple antennas. The receiver also includes a rank feedback unit configured to feed back a transmission rank selection, wherein the transmission rank selection corresponds to a transmission rank feedback reduction scheme. The receiver further includes a precoding feedback unit configured to feed back a precoding matrix selection, wherein the precoding matrix selection corresponds to a precoding matrix feedback reduction scheme.

In one embodiment, the transmitter includes a rank decoding unit configured to extract a transmission rank selection, wherein the transmission rank selection corresponds to a transmission rank feedback reduction scheme. The transmitter also includes a precoding decoding unit configured to extract a precoding matrix selection, wherein the precoding matrix selection corresponds to a precoding matrix feedback reduction scheme. The transmitter further includes a transmit unit that is coupled to multiple antennas and configured to apply the transmission rank and precoding matrix selections to data to be transmitted.

In another aspect, the method of operating a receiver includes receiving transmissions from multiple antennas and providing a transmission rank selection, wherein the transmission rank selection corresponds to a transmission rank feedback reduction scheme. The method also includes providing a precoding matrix selection, wherein the precoding matrix selection corresponds to a precoding matrix feedback reduction scheme.

In yet another aspect the method of operating a transmitter includes extracting a transmission rank selection, wherein the transmission rank selection corresponds to a transmission rank feedback reduction scheme. The method also includes extracting a precoding matrix selection, wherein the precoding matrix selection corresponds to a precoding matrix feedback reduction scheme and applying the transmission rank and precoding matrix selections to data to be transmitted.

The foregoing has outlined preferred and alternative features of the present disclosure so that those skilled in the art may better understand the detailed description of the disclosure that follows. Additional features of the disclosure will be described hereinafter that form the subject of the claims of the disclosure. Those skilled in the art will appreciate that they can readily use the disclosed conception and specific embodiment as a basis for designing or modifying other structures for carrying out the same purposes of the present disclosure.

BRIEF DESCRIPTION OF THE DRAWINGS

For a more complete understanding of the present disclosure, reference is now made to the following descriptions taken in conjunction with the accompanying drawings, in which:

FIG. 1A illustrates a system diagram of a receiver as provided by one embodiment of the disclosure;

FIG. 1B illustrates a system diagram of a transmitter as provided by one embodiment of the present disclosure;

DETAILED DESCRIPTION

Figure 2:
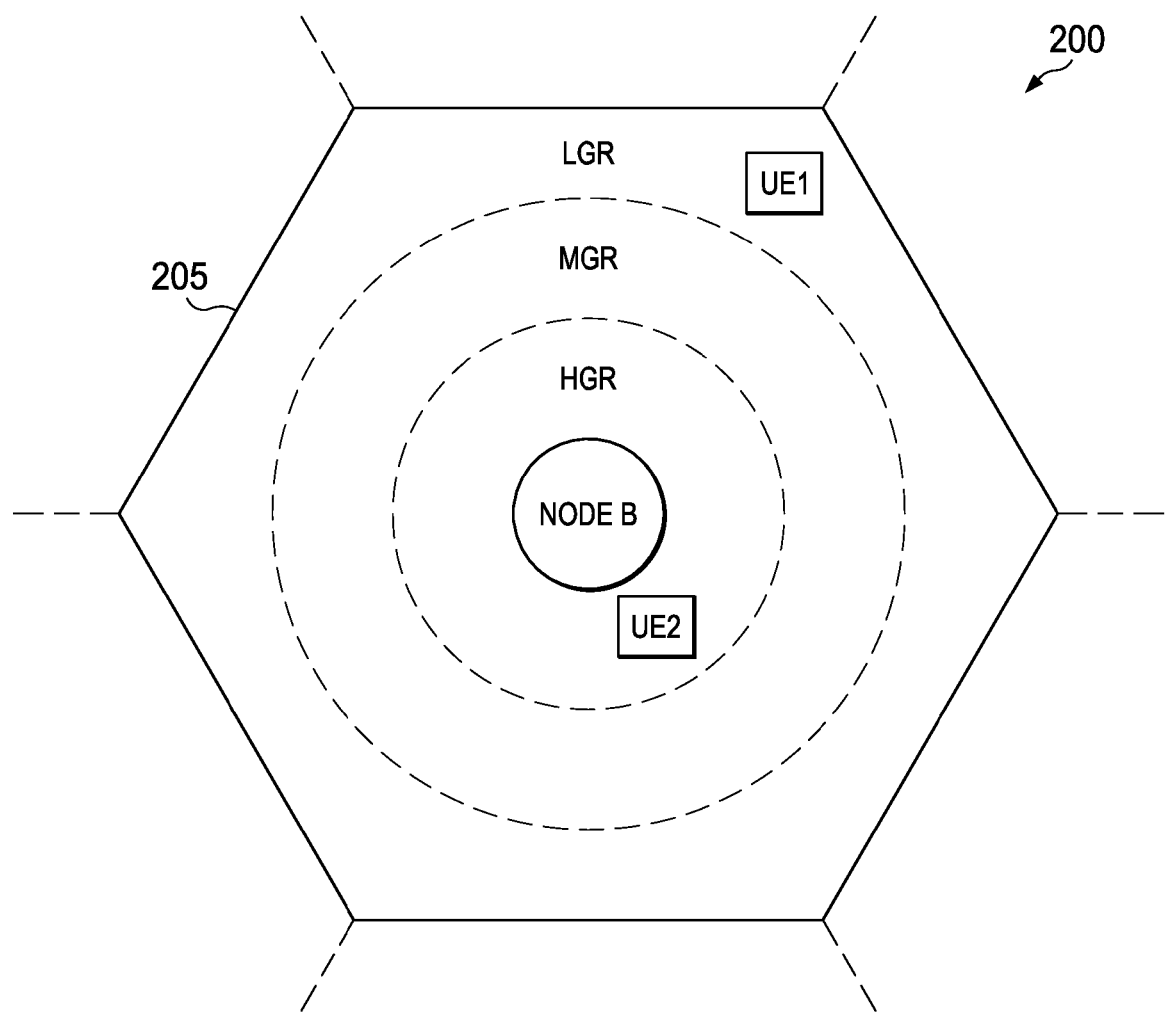
FIG. 2 illustrates a diagram of an embodiment of a transmission rank subset configuration 200 based on a receiver geometry.

Rank adaptation may be allowed in the frequency domain where different RBs choose different transmission ranks (i.e., a different number of transmission layers). Another alternative is to perform rank adaptation only in the time domain. In other words, the transmission rank for each UE may be fixed across the system bandwidth at a particular point in time, because a performance gain of allowing rank adaptation in the frequency domain may be marginal.

On the other hand, preceding matrix adaptation may be performed according to one of the following principles. A single wideband preceding matrix (or its index (PMI)) may be selected for the system bandwidth. Alternatively, a single frequency-selective PMI may be chosen for a specific frequency sub-band that includes several RBs. Furthermore, a combination of the wideband PMI in addition to the frequency-selective sub-band PMI may also be feed back.

Since preceding adapts to an instantaneous change in the channel, the preferred preceding matrix varies at the same feedback rate as the CQI and therefore may be assigned the same CQI feedback rate. However, the preferred rank may change at a slower rate thereby significantly reducing the rank feedback rate and producing a small throughput loss. Since the preferred rate for a rank feedback requirement may be substantially different from that of preceding feedback, the rank feedback may be defined and encoded separately from the preceding feedback and CQI feedback.

In embodiments of this disclosure, several more efficient rank and PMI feedback schemes are presented. The premises of these areas include significantly reducing the uplink feedback overhead and reducing the computational complexity in deriving a preferred rank and PMI. Throughout this disclosure, R(t) and P(t) may be used to denote the preferred rank and PMI at time t.

FIG. 1A illustrates a system diagram of a receiver 100 as provided by one embodiment of the disclosure. In the illustrated embodiment, the receiver 100 operates in an OFDMA communications system. The receiver 100 includes a receive unit 105 and a feedback generator 110. The receive unit 105 includes an OFDM module 107 having Q OFDM demodulators that are coupled to corresponding receive antennas, a MIMO detector module 107, a QAM demodulator, deinterleaver and FEC decoding module 108, and a channel estimation module 109.

The receive unit 105 is primarily employed to receive data signals from a transmission corresponding to a transmission rank and preceding matrix selection that was determined by the receiver 100. The OFDM module 106 demodulates the received data signals and provides them to the MIMO detector 107, which employs channel estimation and precoder information to further provide the received data to the module 108 for further processing (namely, QAM demodulation, deinterleaving, and FEC decoding). The channel estimation module 109 employs previously transmitted channel estimation signals to provide the channel estimates need by the receiver 100.

The feedback generator 110 includes a CQI computer 111, a rank feedback unit 112, a preceding feedback unit 113 and a feedback encoder 114. The CQI computer 111 provides a channel quality based on channel estimation. The rank feedback unit 112 is configured to provide a transmission rank selection, wherein the transmission rank selection corresponds to a reduction in transmission rank feedback. Correspondingly, the preceding feedback unit 113 is configured to provide a preceding matrix selection, wherein the preceding matrix selection corresponds to a reduction in preceding matrix feedback. The feedback encoder 114 then encodes CQI information, the transmission rank selection and the preceding matrix selection and feeds it back for a subsequent data transmission.

FIG. 1B illustrates a system diagram of a transmitter 150 as provided by one embodiment of the present disclosure. In the illustrated embodiment, the transmitter operates in an OFDMA communication system. The transmitter 150 includes a transmit unit 155 and a feedback decoder 160. The transmit unit 155 includes a modulation and coding scheme (MCS) module 156, a precoder module 157 and an OFDM module 158 having multiple OFDM modulators that feed corresponding transmit antennas. The feedback decoder 160 includes a feedback receiver 166, a rank decoding unit 167 and a preceding decoding unit 168.

The feedback receiver 166 receives CQI information as well as transmission rank selection and preceding matrix selections that have been fed back. The rank decoding unit 167 is configured to extract a transmission rank selection, wherein the transmission rank selection corresponds to a reduction in transmission rank feedback. Correspondingly, the preceding decoding unit 168 is configured to extract a preceding matrix selection, wherein the preceding matrix selection corresponds to a reduction in preceding matrix feedback. The transmission rank selection is provided to the MCS module 156, and the preceding matrix selection is provided to the precoder module 157.

Generally, the transmit unit 155 is coupled to multiple antennas and configured to apply the transmission rank and preceding matrix selections to data to be transmitted. The MCS module 156 and precoder module 157 employ transmission rank and preceding matrix selections obtained from the feedback decoder 160. The MCS module 156 employs the transmission rank selection to map input data to indicated spatial streams. The precoder module 157 then maps the spatial streams linearly into output data streams for transmission by the OFDM module 158.

With continued reference to the receiver 100 and the transmitter 150 of FIGS. 1A and 1B, subsequent discussions are provided for embodiments of the present disclosure wherein the receiver 100 is associated with user equipment (UE) and the transmitter 150 is associated with a serving base station (Node B) in a cellular communications network. Of course, this is only one of many embodiments based on the principles of the present disclosure. Some observations regarding transmission rank and preceding matrix adaptation rates are presented in the following.

Rank adaptation occurs more frequently at higher UE speed and therefore requires more feedback to adapt to the channel variation. When UE speed is below 10 kph, change in rank typically occurs every tens of milliseconds. However when the UE speed increases beyond 30 kph, the change in rank typically occurs every five to six sub-frames, where one sub-frame is equal to one millisecond.

A dependence on receiver geometry may also be observed. In low geometry or high geometry ranges, the UE is more likely to choose the lowest or the highest possible rank, respectively. Hence, the change in transmission rank occurs at a much lower rate. When a medium geometry range is observed, the optimum rank may fall into a wider range of possible numbers (e.g., rank 1, 2, 3, or 4), thereby necessitating more frequent rank feedback.

The change in preceding matrices happens at a significantly higher rate than rank adaptation. Unlike rank adaptation, preceding adaptation may be frequent, even at high and low geometry ranges. In such cases, the UE may likely choose the highest rank (e.g., two for 4×2 transmit-receive antenna configurations, and four for 4×4 transmit-receive antenna configurations) for many channel realizations. However, the optimum preceding matrix still varies within the same rank.

Based on the above principles, the following rank feedback reduction schemes are considered. Rank feedback interval may be designed as a function of the UE speed. When the UE moves at a higher speed, rank feedback should be scheduled more frequently to adapt to the fast channel variation. When UE moves at a lower speed and the channel varies slowly, rank feedback may be carried out less frequently to reduce uplink overhear. The rank feedback rate may be semi-statically configured by the higher-layer control. Note that rank feedback rate can be UE-specific or cell-specific.

To reduce the feedback overhead, rank feedback interval may also take into account the UE geometry. At very low or very high geometry ranges, it is statistically more likely for the UE to persist to the lowest or the highest rank(s) for most of the time, therefore less frequent rank feedback may be scheduled. In the medium geometry range, the preferred rank varies within a wide range of possible ranks. Hence, feedback may be scheduled more frequently to adapt to a faster channel variation.

Additionally, it is not precluded to configure the rank feedback interval by taking into account the rate of variation of interference as well as the desired UE's channel itself. A low-speed UE may also have rapid CQI variation because of "burstiness" in neighbor cell traffic. In this case, a faster feedback rate may be configured for a low-speed UE.

The rank feedback interval may be configured to be larger or at least no smaller than the CQI/PMI feedback interval. In other words, the rank feedback rate is equal to or smaller than that of the CQI/PMI feedback rate. Particularly, it is possible to configure the rank feedback periodicity to be M times larger than the CQI/PMI feedback periodicity, where M≥1. Note that the value of M may be determined at the Node B or the UE, UE-specifically or cell-specifically. In addition, it is not precluded to configure the rank and CQI/PMI feedback to be allowed to occur at the same feedback instant, or forbid them to occur at the same time by properly choosing the feedback instant.

An additional rank feedback reduction principle is given as follows. The preferred rank, equivalent to the number of data sub-streams transmitted simultaneously, is chosen to maximize system performance (e.g., throughput under a tolerated error rate). It can be considered as a projection or mapping of a non-precoded MIMO channel into the discrete space containing all positive integer rank candidates Z={1,2,3, . . . }. Since the channel is continuous in the time domain and the preferred rank is a function of the channel, the preferred rank may also possess some continuous-like properties in the discrete space and is therefore unlikely to change abruptly. The preferred ranks of two consecutive feedback instants should be close to each other. In most cases, the rank may remain the same, increase by one or decrease by one compared to the preferred rank of the previous feedback.

As a result of the continuous-like property, the following scheme can also be used to reduce the feedback overhead and also reduce the rank search complexity. In contrast to full rank adaptation where the preferred rank is selected from all possible ranks, it is possible to perform rank adaptation within a smaller rank subset which contains only a few possible ranks. For example, for a 4×4 MIMO system where the full rank set includes rank-1, rank-2, rank-3 and rank-4, the possible rank subset could includes N different elements from {1,2,3,4} where 1≤N≤4. One example of the rank subset is {1,2}. Another example of the possible rank subset is {3,4}.

The rank subset may be configured based on one or several parameters reflecting the overall channel condition of the UE. Examples of such parameters include but are not limited to, geometry, condition number of the MIMO channel, throughput averaged over a certain window in the time domain or frequency domain. For example, if the UE's geometry is under a pre-defined lower threshold (which could be designed offline), if the UE's distance to the serving Node B is larger than a threshold or the UE is experiencing a less favorable channel and hence more likely to be operating at a low rank. Thus, it may be beneficial to restrict the rank adaptation within a small rank subset (e.g., {1} or {1,2}) to reduce the rank/PMI adaptation complexity. On the other hand, if the UE's geometry is beyond a pre-defined threshold or if its distance to the serving Node B is small, it has a better wireless channel and thus more likely to choose a higher rank. In such a case the rank subset may consist of a higher value rank candidate (e.g., {3}, {4} or {3,4}).

FIG. 2 illustrates a diagram of an embodiment of a transmission rank subset configuration 200 based on a receiver geometry in combination with other schemes. In FIG. 2, low, medium and high receiver geometry ranges (LGR, MGR, HGR) are defined within a communication cell 205 for first and second UEs (UE1, UE2) with respect to a serving Node B. UE1 may be assigned a small rank subset since it is in the low geometry range. Correspondingly, UE2 may be assigned a high rank subset it is in the high geometry range.

Returning to FIGS. 1A and 1B, the geometry metric used in the above principals may be calculated according to several criteria. Possible candidates are time average of the following parameters, (1) Frobenius norm of the un-precoded MIMO channel and (2) sum CQI over multiple data sub-streams. Rank subset configuration may be UE-specific, cell-specific, geometry-specific, Doppler-specific, or a combination of the above. The subset may be determined at the UE or configured at the Node B and sent to the UE via higher layer signaling.

Yet another rank feedback reduction scheme is possible as a result of the continuous-like property of rank variation. The preferred rank of a UE at a particular feedback instant may be searched over a small subset of ranks centered around a reference rank, which may be the preferred rank of a previous feedback instant. For example denote the preferred rank at feedback instant t as R(t). Then, it is possible to search R(t+n), n⟨$n_{max}$ only from the subset $$\Pi = \{R \| R - R(t) | \langle d_{thresh} \} \quad (1)$$

where $d_{thresh}$ bounds the maximum rank change from a previous preferred rank feedback, and $n_{max}$ is an integer number. It is noted that $n_{max}$ may be configured based on the UE speed or equivalently Doppler of the channel. This scheme has the benefits of reducing the rank and PMI search complexity at the UE because (1) a smaller subset of ranks are searched over; and (2) only preceding matrices in the codebook of the allowed ranks are searched.

For differential rank feedback, a 1-bit feedback may be used to send Node B the difference between the current rank and the previous rank, instead of feeding back the exact rank of the current time instant. The preferred rank R(t+n) is highly likely be in the set {R(t)−1,R(t),R(t)+1}. Hence, a single bit is used to denote the difference ΔR=R(t+n)−R(t). This effectively reduces the number of bits for feeding back $$\text{Feedback} = \begin{cases} 1 & R(t+n) = R(t)+1 \\ 0 & \text{if } R(t+n) = R(t) \\ -1 & R(t+n) = R(t)-1 \end{cases} \quad (2)$$

For the case of differential rank feedback, a potential issue is that of error propagation. More precisely, when the UE's preferred rank signal is incorrectly decoded by the Node B, the Node B picks a rank that is not what the UE has fed back. From the time the first decoding error occurs, the UE and the Node-B have different "local" versions of the transmission rank. Since the feedback signaling only accounts for differences from the "local" transmission rank at the UE, the UE's preferred rank and the Node B's reconstruction of the rank signal may progressively diverge from the time of the first error. There are two solutions to this problem.

Signal the offset between the preferred rank of the current feedback with respect to the rank that has been used by the Node B, instead of what the UE has chosen as the preferred rank. By doing so, when an error occurs in the rank feedback, the UE can move the solution gradually towards the correct one. An alternative solution is to periodically reset the progression by feeding back the exact preferred rank (without subset restrictions) every L milliseconds.

For preceding matrix or PMI feedback reduction schemes, the previous principle of choosing the preferred rank within a subset of rank candidates close to the preferred rank of the last feedback may also be applied to the PMI selection and feedback. A single PMI is chosen for a frequency sub-band, which contains a number of adjacent RBs, to maximize the system throughput, which could be closely approximated as $$T = \log_2 \det\left(I + \frac{\rho}{N\beta}HUU^+H^+\right) \leq \log_2 \det\left(+\frac{\rho}{N\beta}\|HU\|_F^2\right) \quad (3)$$

where $\beta$ is the SNR gap indicating the difference between the Shannon capacity and the actual throughput with finite MCS, and $\|(\cdot)\|_F^2$ is the Frobenius norm.

Conventionally, the preferred preceding matrix is chosen from the entire codebook of all ranks based on a certain optimality metric such as throughput maximization. However, the feedback efficiency of the art can be improved by exploiting the channel correlation across adjacent time instants. More precisely, since the channel H varies smoothly over time one expects as a result, an efficient PMI searching scheme that searches over a subset of preceding matrices centered at the PMI of the previous feedback. An exemplary distance measure is the Chordal distance $$d(U_i, U_j) = \frac{1}{\sqrt{2}}\|U_i U_i^+ - U_j U_j^+\|_F \quad (4)$$

Note that other distance measures are certainly not precluded. Given a certain distance measure, the preferred PMI of a given sub-band is then selected from those matrices that are close to the preceding matrix at the previous feedback instant. For example, one possible PMI subset selection scheme is to search $$U(t+n) = \underset{U(t+n) \in \Psi}{\mathrm{argmax}} \log_2 \det\left(I + \frac{\rho}{N\beta}HUU^+H^+\right), n \leq n_{max} \quad (5)$$

where $$\Psi = \{U | d(U, U(t)) < \Gamma\} \quad (6)$$

is the subset of preceding matrices whose distance to the previous preceding matrix is bounded by a threshold $\Gamma$. As a small subset of the codebook is searched over, the selection or computational complexity and the number of bits for PMI feedback are both reduced.

Alternatively, it is also feasible to search the preferred PMI for each sub-band from a subset of PMIs whose distance to the wideband PMI of the current or a previous feedback instant is within a given threshold. The wideband PMI is a single PMI selected for the system bandwidth or a fraction of the system bandwidth configured for the wideband PMI selection. The threshold for PMI subset restriction could be UE specific, cell specific or configured at either the UE or the Node B.

Note that the codebook is pre-defined and a distance metric between two arbitrary precoding matrices is known. Therefore, defining a distance threshold is equivalent to defining the size of the preceding matrix subset to search over. In other words, the size of the candidate matrix subset N (e.g., 2,4,6,8, etc.) may be defined, which is the number of the closest precoding matrices to the previous preceding matrix that was fed back.

An adaptive PMI may be fed back (similar to the rank in a differential format) to reduce the feedback rate, where the differential is taken over the index of the PMI matrices. Techniques analogous to the differential rank feedback may be used to mitigate error propagation in differential PMI feedback.

Figure 3:
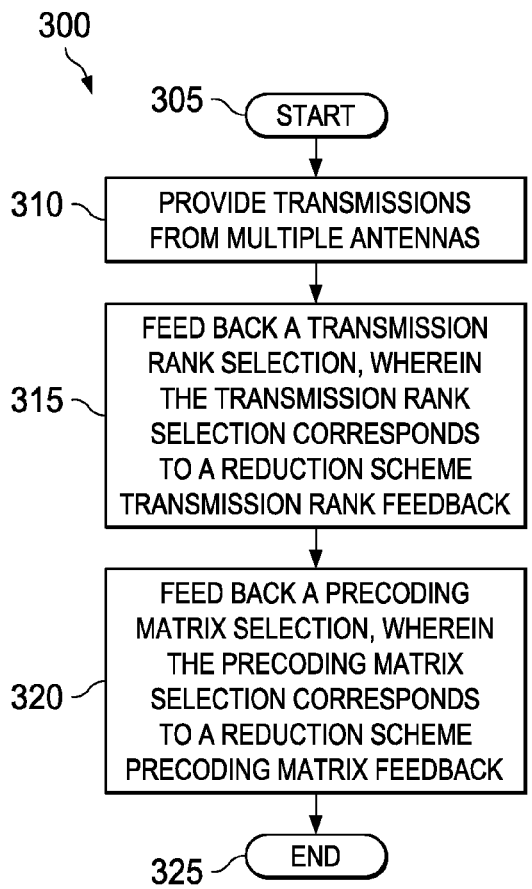
FIG. 3 illustrates a flow diagram of an embodiment of a method of operating a receiver carried out according to the principles of the present disclosure.

FIG. 3 illustrates a flow diagram of an embodiment of a method 300 of operating a receiver carried out according to the principles of the present disclosure. The method 300 starts in a step 305 and transmissions from multiple antennas are received in a step 310. Then, in a step 315, a transmission rank selection is fed back, wherein the transmission rank selection corresponds to a transmission rank feedback reduction scheme.

In one embodiment, an update rate of the transmission rank selection is a function of a speed of the receiver. Additionally, the transmission rank selection is based on a receiver geometry with respect to the multiple antennas that provide the transmissions. Correspondingly, the transmission rank selection is restricted to a subset of available transmission ranks that is either determined by the receiver or configured by the received transmissions.

In one embodiment, the transmission rank selection is a differential rank that corresponds to a difference between a current transmission rank and a reference transmission rank. Additionally, the reference transmission rank may include the last transmission rank selection.

A preceding matrix selection is fed back, wherein the preceding matrix selection corresponds to a preceding matrix feedback reduction scheme, in a step 320. In one embodiment, the preceding matrix selection corresponds to a single preceding matrix for a frequency sub-band that contains at least two adjacent resource blocks. Alternatively, the preceding matrix selection is restricted to a subset of available preceding matrices that is also determined by the receiver or configured by the received transmissions.

In one embodiment, the precoding matrix selection is a differential preceding matrix that corresponds to a difference between a current preceding matrix and a reference preceding matrix. The preceding matrix selection may correspond to a time domain representation or a frequency domain representation.

In one embodiment, the preceding matrix selection corresponds to a subset of precoding matrices that relates to a reference preceding matrix, and the reference preceding matrix is the last preceding matrix selection. Alternatively, the reference preceding matrix may be a wideband preceding matrix selected for at least a portion of the system bandwidth. Additionally, the subset may contain preceding matrices that are closest to the reference preceding matrix according to a distance measure wherein the distance measure is selected employing a Chordal distance norm or a Frobenius distance norm. The method 300 ends in a step 325.

Figure 4:
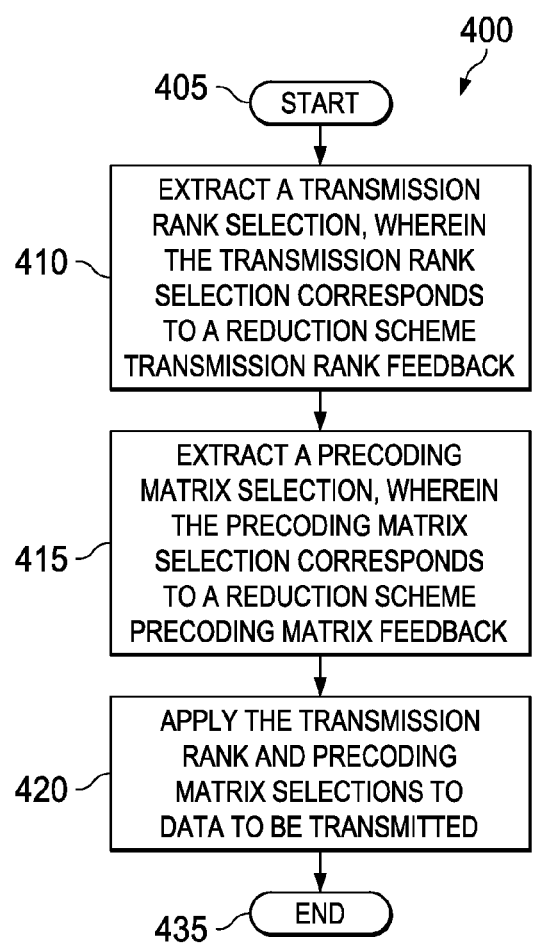
FIG. 4 illustrates a flow diagram of an embodiment of a method of operating a transmitter carried out according to the principles of the present disclosure.

FIG. 4 illustrates a flow diagram of an embodiment of a method 400 of operating a transmitter carried out according to the principles of the present disclosure. The method 400 starts in a step 405. Then, in a step 410, a transmission rank selection is extracted, wherein the transmission rank selection corresponds to a transmission rank feedback reduction scheme.

In one embodiment, an update rate of the transmission rank selection is a function of a speed of a receiver. Additionally, the transmission rank selection is based on a receiver geometry with respect to multiple transmit antennas. Correspondingly, the transmission rank selection is restricted to a subset of available transmission ranks that is configured by the transmitter or determined by a receiver.

In one embodiment, the transmission rank selection is a differential rank that corresponds to a difference between a current transmission rank and a reference transmission rank. Additionally, the reference transmission rank may include the last transmission rank selection.

In a step 415, a preceding matrix selection is extracted, wherein the preceding matrix selection corresponds to a preceding matrix feedback reduction scheme. In one embodiment, the preceding matrix selection corresponds to a single preceding matrix for a frequency sub-band that contains at least two adjacent resource blocks. Alternatively, the preceding matrix selection is restricted to a subset of available preceding matrices that is also configured by the transmitter or determined by a receiver.

In one embodiment, the preceding matrix selection is a differential preceding matrix that corresponds to a difference between a current preceding matrix and a reference preceding matrix. The preceding matrix selection may correspond to a time domain representation or a frequency domain representation.

In one embodiment, the preceding matrix selection corresponds to a subset of preceding matrices that relates to a reference preceding matrix wherein the reference preceding matrix may be the last preceding matrix selection. Alternatively, the reference preceding matrix is a wideband preceding matrix selected for at least a portion of the system bandwidth. Additionally, the subset contains preceding matrices that are closest to the reference preceding matrix according to a distance measure, wherein the distance measure is selected employing a Chordal distance norm or a Frobenius distance norm. The transmission rank and preceding matrix selections are applied to data to be transmitted in a step 420, and the method 400 ends in a step 425.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which the disclosure relates will appreciate that other and further additions, deletions, substitutions and modifications may be made to the described example embodiments without departing from the disclosure.

What is claimed is:

1. A receiver, comprising:
  a receive unit configured to receive transmissions from multiple antennas;
  a rank feedback unit configured to provide a transmission rank selection, wherein the transmission rank selection corresponds to a transmission rank feedback reduction scheme; and
  a precoding feedback unit configured to provide a precoding matrix selection, wherein the precoding matrix selection corresponds to a precoding matrix feedback reduction scheme and wherein the precoding matrix selection is restricted to a subset of available precoding matrices that is transmission-configured or receiver-determined.

2. A receiver, comprising:
  a receive unit configured to receive transmissions from multiple antennas;
  a rank feedback unit configured to provide transmission rank selection, wherein the transmission rank selection corresponds to a transmission rank feedback reduction scheme; and
  a precoding feedback unit configured to provide a precoding matrix selection, wherein the precoding matrix selection corresponds to a precoding matrix feedback reduction scheme and wherein the precoding matrix selection corresponds to a subset of precoding matrices that relates to a reference precoding matrix.

3. The receiver as recited in claim 2 wherein the reference precoding matrix is the last precoding matrix selection.

4. The receiver as recited in claim 2 wherein the reference precoding matrix is a wideband precoding matrix selected for at least a portion of the system bandwidth.

5. The receiver as recited in claim 2 wherein the subset contains precoding matrices that are closest to the reference precoding matrix according to a distance measure.

6. The receiver as recited in claim 5 wherein the distance measure is selected from the group consisting of:
  a Chordal distance norm; and
  a Frobenius distance norm.

7. A receiver, comprising:
  a receive unit configured to receive transmissions from multiple antennas;
  a rank feedback unit configured to provide a transmission rank selection, wherein the transmission rank selection corresponds to a transmission rank feedback reduction scheme; and
  a precoding feedback unit configured to provide a precoding matrix selection, wherein the precoding matrix selection corresponds to a precoding matrix feedback reduction scheme and wherein the precoding matrix selection is a differential precoding matrix that corresponds to a difference between a current precoding matrix and a reference precoding matrix.

8. A method of operating a receiver, comprising:
  receiving transmissions from multiple antennas;
  feeding back a transmission rank selection, wherein the transmission rank selection corresponds to a transmission rank feedback reduction scheme; and
  feeding back a precoding matrix selection, wherein the precoding matrix selection corresponds to a precoding matrix feedback reduction scheme and wherein the precoding matrix selection is restricted to a subset of available precoding matrices that is transmission-configured or receiver-determined.

9. A method of operating a receiver, comprising:
  receiving transmissions from multiple antennas;
  feeding back a transmission rank selection, wherein the transmission rank selection corresponds to a transmission rank feedback reduction scheme; and feeding back a precoding matrix selection, wherein the precoding matrix selection corresponds to a precoding matrix feedback reduction scheme and wherein the precoding matrix selection corresponds to a subset of precoding matrices that relates to a reference precoding matrix.

10. The method as recited in claim 9 wherein the reference precoding matrix is the last precoding matrix selection.

11. The method as recited in claim 9 wherein the reference precoding matrix is a wideband precoding matrix selected for at least a portion of the system bandwidth.

12. The method as recited in claim 9 wherein the subset contains precoding matrices that are closest to the reference precoding matrix according to a distance measure.

13. The method as recited in claim 12 wherein the distance measure is selected from the group consisting of:
a Chordal distance norm; and
a Frobenius distance norm.

14. A method of operating a receiver, comprising:
receiving transmissions from multiple antennas;
feeding back a transmission rank selection, wherein the transmission rank selection corresponds to a transmission rank feedback reduction scheme; and
feeding back a precoding matrix selection, wherein the precoding matrix selection corresponds to a precoding matrix feedback reduction scheme and wherein the precoding matrix selection is a differential precoding matrix that corresponds to a difference between a current precoding matrix and a reference precoding matrix.

15. A transmitter comprising:
a rank decoding unit configured to extract a transmission rank selection, wherein the transmission rank selection corresponds to a transmission rank feedback reduction scheme;
a precoding decoding unit configured to extract a precoding matrix selection, wherein the precoding matrix selection corresponds to a precoding matrix feedback reduction scheme, wherein the precoding matrix selection is restricted to a subset of available precoding matrices that is transmitter-configured or receiver-determined; and
a transmit unit that is coupled to multiple antennas and configured to apply the transmission rank and precoding matrix selections to data to be transmitted.

16. A transmitter comprising:
a rank decoding unit configured to extract a transmission rank selection, wherein the transmission rank selection corresponds to a transmission rank feedback reduction scheme;
a precoding decoding unit configured to extract a precoding matrix selection, wherein the precoding matrix selection corresponds to a precoding matrix feedback reduction scheme, wherein the precoding matrix selection corresponds to a subset of precoding matrices that relates to a reference precoding matrix; and
a transmit unit that is coupled to multiple antennas and configured to apply the transmission rank and precoding matrix selections to data to be transmitted.

17. The transmitter as recited in claim 16 wherein the reference precoding matrix is the last precoding matrix selection.

18. The transmitter as recited in claim 16 wherein the reference precoding matrix is a wideband precoding matrix selected for at least a portion of the system bandwidth.

19. The transmitter as recited in claim 16 wherein the subset contains precoding matrices that are closest to the reference precoding matrix according to a distance measure.

20. The transmitter as recited in claim 19 wherein the distance measure is selected from the group consisting of:
a Chordal distance norm; and
a Frobenius distance norm.

21. A transmitter comprising:
a rank decoding unit configured to extract a transmission rank selection, wherein the transmission rank selection corresponds to a transmission rank feedback reduction scheme;
a precoding decoding unit configured to extract a precoding matrix selection, wherein the precoding matrix selection corresponds to a precoding matrix feedback reduction scheme, wherein the precoding matrix selection is a differential precoding matrix that corresponds to a difference between a current precoding matrix and a reference precoding matrix; and
a transmit unit that is coupled to multiple antennas and configured to apply the transmission rank and precoding matrix selections to data to be transmitted.

22. A method of operating a transmitter comprising:
extracting a transmission rank selection, wherein the transmission rank selection corresponds to a transmission rank feedback reduction scheme;
extracting a precoding matrix selection, wherein the precoding matrix selection corresponds to a precoding matrix feedback reduction scheme, wherein the precoding matrix selection is restricted to a subset of available precoding matrices that is transmitter-configured or receiver-determined; and
applying the transmission rank and precoding matrix selections to data to be transmitted.

23. A method of operating a transmitter comprising:
extracting a transmission rank selection, wherein the transmission rank selection corresponds to a transmission rank feedback reduction scheme;
extracting a precoding matrix selection, wherein the precoding matrix selection corresponds to a precoding matrix feedback reduction scheme, wherein the precoding matrix selection corresponds to a subset of precoding matrices that relates to a reference precoding matrix; and
applying the transmission rank and precoding matrix selections to data to be transmitted.

24. The method as recited in claim 23 wherein the reference precoding matrix is the last precoding matrix selection.

25. The method as recited in claim 23 wherein the reference precoding matrix is a wideband precoding matrix selected for at least a portion of the system bandwidth.

26. The method as recited in claim 23 wherein the subset contains precoding matrices that are closest to the reference precoding matrix according to a distance measure.

27. The method as recited in claim 26 wherein the distance measure is selected from the group consisting of:
a Chordal distance norm; and
a Frobenius distance norm.

28. A method of operating a transmitter comprising:
extracting a transmission rank selection, wherein the transmission rank selection corresponds to a transmission rank feedback reduction scheme;
extracting a precoding matrix selection, wherein the precoding matrix selection corresponds to a precoding matrix feedback reduction scheme, wherein the precoding matrix selection is a differential precoding matrix that corresponds to a difference between a current precoding matrix and a reference precoding matrix; and applying the transmission rank and precoding matrix selections to data to be transmitted.

* * * * *